United States Patent [19]

Nicolaisen

[11] Patent Number: 4,505,533
[45] Date of Patent: Mar. 19, 1985

[54] APPARATUS FOR CLAMPING ELECTRIC CONDUCTORS, PARTICULARLY WIRES

[75] Inventor: Holger Nicolaisen, Nordborg, Denmark

[73] Assignee: Danfoss A/S, Nordborg, Denmark

[21] Appl. No.: 456,818

[22] Filed: Jan. 10, 1983

[30] Foreign Application Priority Data

Jan. 16, 1982 [DE] Fed. Rep. of Germany ....... 3201169

[51] Int. Cl.³ .............................................. H01R 9/00
[52] U.S. Cl. ............................. 339/198 R; 339/263 R
[58] Field of Search ............... 339/263, 272 A, 272 R, 339/198 J

[56] References Cited

U.S. PATENT DOCUMENTS

| 3,129,049 | 4/1964 | Anderson | 339/272 R |
| 3,414,866 | 12/1968 | Norden | 339/263 R |
| 3,864,003 | 2/1975 | Boke | 339/272 R |
| 3,994,556 | 11/1976 | Jensen et al. | 339/263 R |
| 4,050,770 | 9/1977 | Rigo | 339/198 J |
| 4,056,301 | 1/1977 | Norden | 339/263 R |
| 4,195,901 | 4/1980 | Lindlau | 339/272 A |

FOREIGN PATENT DOCUMENTS

| 900485 | 10/1944 | France | 339/198 J |
| 902863 | 1/1945 | France . | |
| 813433 | 5/1959 | United Kingdom | 339/198 J |

Primary Examiner—Gil Weidenfeld
Assistant Examiner—David L. Pirlot
Attorney, Agent, or Firm—Wayne B. Easton

[57] ABSTRACT

An electrical conductor clamping apparatus comprising a housing and juxtaposed clamping positions each of which has a clamping member held against rotation in a guide passage. A screw of the clamping member passes through a counterbearing and is held in a receptacle formed by the guide passage and a cover member which defines holes for operating the screwhead. Stiffening of the cover member is obtained in that the cover member is connected to the housing base by way of struts extending perpendicular thereto, allowing the cover member to be comparatively wide without losing its strength. The cover member and the housing are formed in one piece. The clamping members are carried by insert blocks which are received in the clamping positions, securable to the housing by a snap action.

4 Claims, 4 Drawing Figures

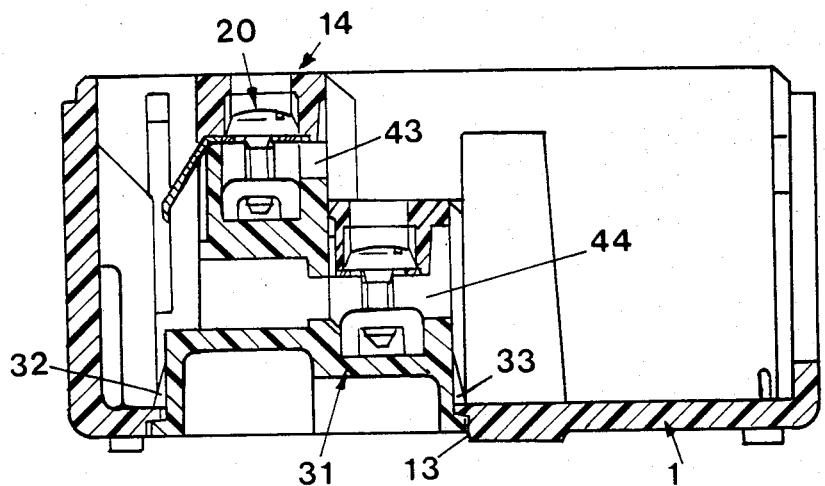
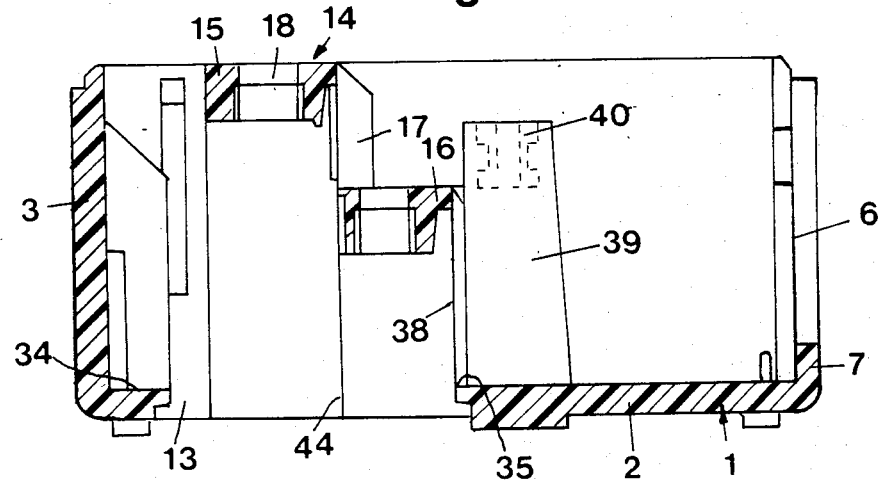
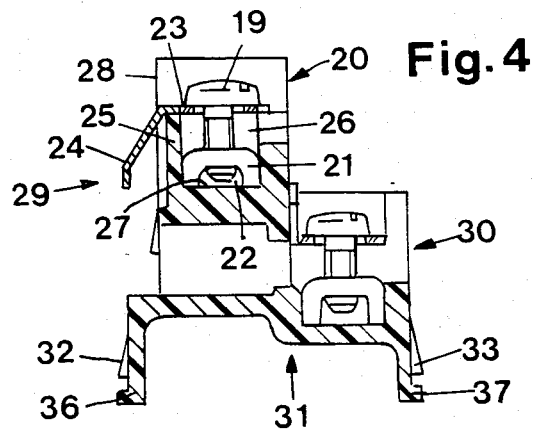

APPARATUS FOR CLAMPING ELECTRIC CONDUCTORS, PARTICULARLY WIRES

The invention relates to an apparatus for clamping electric conductors, especially wires, comprising a housing and juxtaposed clamping positions each of which has a clamping member held against rotation in a guide passage, a screw in a screwthread of the clamping member and a counterbearing through which the screw passes and which is held between the receptacle formed by the guide passage and a cover member defining holes for operating the screwhead.

In a known apparatus of this kind (DE-PS 24 52 091), the counterbearings have two parallel limbs extending along the side walls of the guide passage up to the base thereof whereas the two limbs of the U-shaped clamping member face the other two side walls of the guide passage. The counterbearing has a contact spring which can, for example, make contact with the terminal electrode of an insert card. All the guide passages are part of the housing which comprises a closed base and circumferential side walls. The screw, counterbearing and clamping member are pre-assembled and then respectively inserted in a guide passage. The whole is held by a cover strip which is subsequently placed in the housing.

In this construction, the introduction in the guide passage of the pre-assembled units consisting of the clamping member, counterbearing and screw presents certain difficulties because of the comparatively small dimensions. Simplification by way of fully automatic assembly is not possible because the assembling tools are obstructed by the side walls of the housing. In addition, the cover strips are not very strong.

The invention is therefore based on the problem of providing an apparatus of the aforementioned kind that can be more easily assembled and is stronger as a whole.

This problem is solved according to the invention in that the cover member is made in one piece with the housing, the housing has a cut-out on the opposite side, and the receptacle defines an insert block insertable through the cut-out where it is secured.

In this construction, assembly of the clamping positions can be carried out in the associated guide passages so long as the insert block is still located outside the housing. The guide passages are therefore readily accessible. There is no obstruction by the side walls of the housing. In particular, it therefore presents no difficulties to apply the tools for fully automatic assembly. When this insert block is introduced in the housing through the cut-out, the desired retention of the counterbearings by the cover members is effected automatically. Such insert motion can likewise take place on a fully automatic production line. Higher strength is obtained because the cover member is made in one piece with the housing and the insert block has an adequate inherent rigidity.

Still better stiffening of the cover member is obtained in that the cover member is connected to the housing base by way of at least one strut perpendicular thereto. In particular, this strut can be formed by a column having a screwthread for screw-connecting a cover of the housing. The housing can therefore be comparatively wide without the cover member losing its strength.

In a preferred embodiment, clamping positions are arranged in two rows offset from each other depthwise of the housing. Since the insert block is easily accessible from all sides, one can now also provide more than one row of clamping positions, although the second row must be offset in height to enable the electric conductors of each clamping position to be applied.

In this construction, the cover member connected to the housing may comprise two cover strips which are staggered in height and are interconnected by struts perpendicular thereto. This gives a very high strength for the cover member and the housing so that one can make do with comparatively thin walls and save material.

If counterbearings comprise a contact spring at one side of the row, it is advisable for the contact springs adjacent to the guide passages of the upper row to be disposed on the side opposite to the lower row and for at least one contact spring to be made in one piece with a counterbearing of a clamping position by way of a shaped sheet metal section. For the purpose of making contact with the aid of contact springs, therefore, the clamping positions of the upper row as well as those of the lower row play a part.

With particular advantage, the insert block is securable to the housing by a snap connection. The inserting movement automatically leads to snapping in and hence to immovable seating in the housing.

Advantageously, the insert block comprises a bevelled lug which engages behind the wall of the housing that bounds the cut-out. This calls for no additional expedients on the housing.

If, in a further construction, the housing comprises guide grooves which extend from the two ends of the cut-out and in which guide ribs of the insert block engage, the two elements to be interconnected are positively led to their final position. This feature and the use of the snap connection likewise facilitates assembly of the parts in an automatic production line.

An example of the invention will now be described in more detail with reference to the drawing, wherein:

FIG. 2 is a section on the line 2—2 in FIG. 1;

FIG. 3 is a section of the FIG. 2 housing, and

FIG. 4 is a section of the FIG. 2 insert block.

Figure 1:
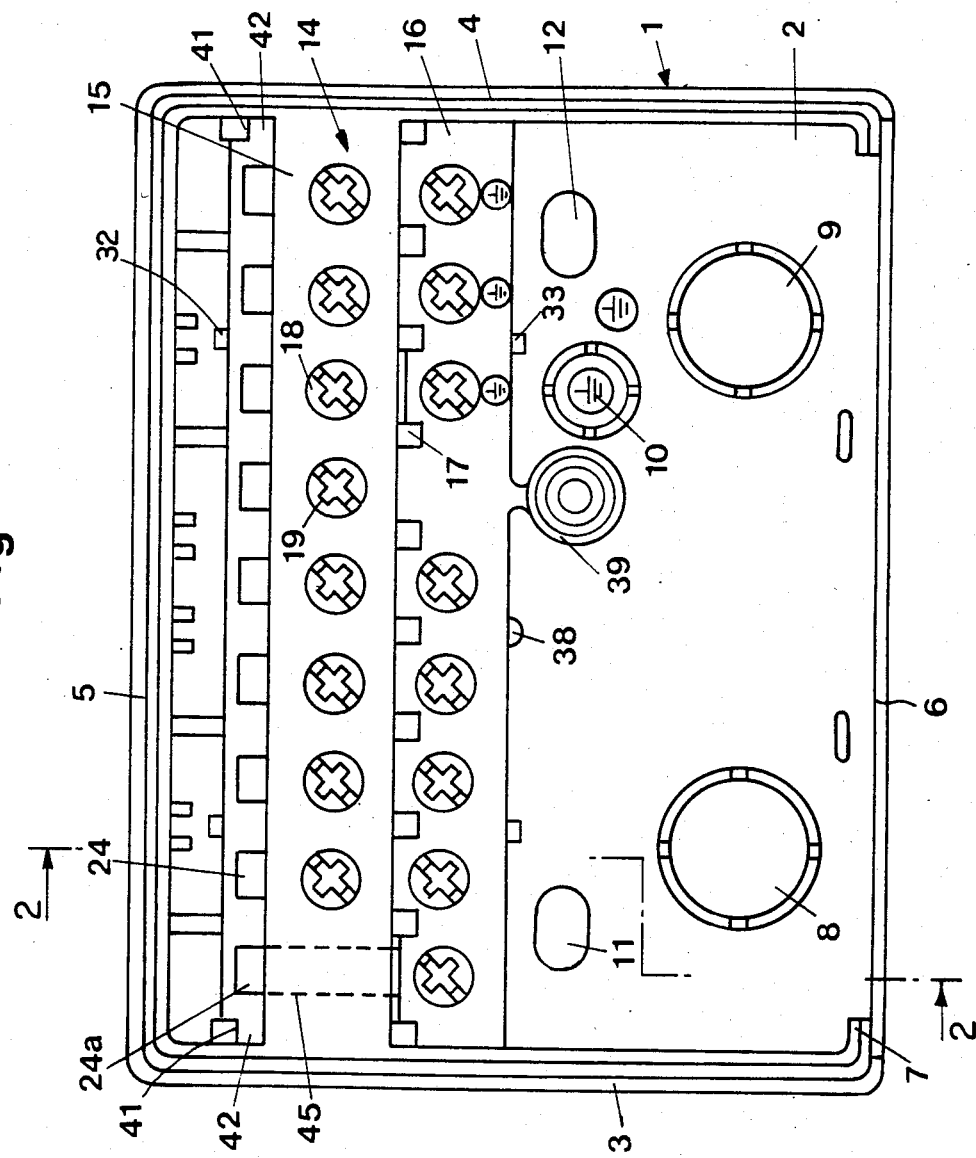
FIG. 1 is a plan view of a housing of the apparatus without cover.

A housing 1 comprises a base 2, two side walls 3 and 4, a rear wall 5 and a front wall 7 provided with an aperture 6. In the base, parts 8, 9 and 10 can be broken out for the passage of cables or for applying an earthing screw. Holes 11 and 12 serve for mounting the housing base. The base of the housing is also provided with a cut-out 13. At the top, the housing 1 is made in one piece with a cover member 14 consisting of two cover strips 15 and 16 which are interconnected by vertical struts 17. These strips have holes 18 for reaching the underlying screws 19.

Each screw 19 forms part of a clamping position 20. The latter also comprises a clamping member 21 of U-shaped cross-section with a screwthread through which the screw 19 passes, the two limbs of the U being guided by the opposed walls of a guide passage 22. In addition, the clamping position comprises a counterbearing 23 through which the screw 19 passes and which is made in one piece with a contact spring 24. The elevation of the counterbearing 23 is determined either by abutting the end face of a wall 25 bounding the guide passage 22 or by lying against downwardly flanged limbs 26 at the base 27 of the guide passage 22. Dividing walls 28 are disposed between the individual clamping positions 20. The clamping positions 20 and guide passages 22 are disposed in two rows 29 and 30 which are offset from each other depthwise of the housing. All the guide passages are formed in an insert block 31 of plastics material.

This insert block 31 comprises locking lugs 32 and 33 on both opposed sides. The lugs are provided with run-up inclinations and engage behind the base 2 of the housing 1 bounding the cut-out 13, i.e. they abut at the positions 34 or 35. A step 36 or 37 prevents excessive insertion of the insert block 31.

For further stiffening of the cover member 14, the lower cover strip 16 is connected to the base 2 of the housing 1 by two struts 38 and 39. The strut 39 is formed by a column in which a tapped bush 40 is inserted, with the aid of which a cover (not shown) of the housing 1 can be screwed tight.

To facilitate introduction, the housing comprises two guide grooves 41 in which appropriate guide ribs 42 of the insert member 31 engage.

As may be seen in the drawings the cover member strips are horizontally between the front and rear walls and spaced therefrom with the strip 15 being horizontally between the strip 16 and the rear wall, and at a higher elevation than the strip 16. Further the contact springs extend between the insert block and the rear wall. Also, the struts 38, 39 are horizontally spaced from the side walls.

In the production of this clamping apparatus, the screws 19 and the associated clamping member 21 and the counterbearing 23 are first of all pre-assembled and inserted in the insert block 31 along an automatic production line. At a second station, the housing 1 is placed over this insert block from above until the locking lugs 32, 33 engage behind the positions 34 and 35. In this way, the screws 19, clamping members 21 and counterbearings 23 are securely held in place by the cover member 14.

If electric conductors are later to be clamped in position, only the slots 43 or 44 formed in the insert block are available for their introduction. The conductors, which are pushed in from one or the other side of the screw 19 are securely clamped by tightening the screw because they cannot deflect laterally.

If a counterbearing of the lower row 30 is to be provided with a contact spring 24a, these components need only be interconnected by a shaped sheet metal section 45 made in one piece therewith.

What is claimed is:

1. Apparatus for clamping electrical conductors comprising a housing having a base, side walls joined to the base and a cover member joined to the side walls in spaced relationship to the base, an insert block having a plurality of side by side guide passages, a clamp means for each guide passage for clampingly engaging an electrical conductor, each of the clamp means including a clamp member mounted in the respective guide passage for being held against rotation therein and a screw threaded in each clamp member, said base having an insert block cut-out for having the insert block extending therein and said passages opening toward the cover member, and said cover member having holes aligned with said screws and passages, said insert block having openings for access by the electrical conductors to said clamp means, the cover member comprises a first and a second strip with the first strip being of a greater spacing from the base than the second strip and offset therefrom, the first strip having the above mentioned holes, that the insert block has a second plurality of guide passages in side by side relationship that open toward the second strip, that there is provided a second clamp means for each of the second passages for clampingly engaging an electrical conductor, each of the second clamp means including a clamp member mounted in the respective second guide passage for being held against rotation therein and a screw threaded in each of the second clamp members, said second strip having holes aligned with the second passages and second clamp means screws, and that said insert block has openings for access by the electrical conductors to the second clamping means, and that the housing and cover member are made in one piece.

2. Apparatus for clamping electrical conductors comprising a housing having a base, side walls joined to the base and a cover member joined to the side walls in spaced relationship to the base, an insert block having a plurality of side by side guide passages, a clamp means for each guide passage for clampingly engaging an electrical conductor, each of the clamp means including a clamp member mounted in the respective guide passage for being held against rotation therein and a screw threaded in each clamp member, said base having an insert block cut-out for having the insert block extending therein and said passages opening toward the cover member, and said cover member having holes aligned with said screws and passages, said insert block having openings for access by the electrical conductors to said clamp means, the cover member comprises a first and a second strip with the first strip being of a greater spacing from the base than the second strip and offset therefrom, the first strip having the above mentioned holes, that the insert block has a second plurality of guide passages in side by side relationship that open toward the second strip, that there is provided a second clamp means for each of the second passages for clampingly engaging an electrical conductor, each of the second clamp means including a clamp member mounted in the respective second guide passage for being held against rotation therein and a screw threaded in each of the second clamp members, said second strip having holes aligned with the second passages and second clamp means screws, and that said insert block has openings for access by the electrical conductors to the second clamping means, and that the cover member has vertical struts for interconnecting the first and second strips.

3. The apparatus of claim 2 further characterized in that there is provided at least one strut that is joined to each of the second strip and base and extending perpendicular to the base.

4. The apparatus of claim 3 further characterized in that the said at least one strut comprises a column and that there is provided a tapered bushing mounted by the column remote from the base.

* * * * *